March 31, 1964 R. R. RITTER 3,127,593

PERIODIC SIGNAL SYNCHRONIZER

Filed June 13, 1960

INVENTOR

ROLLAND R. RITTER

BY Cushman, Darby & Cushman

ATTORNEYS

United States Patent Office
3,127,593
Patented Mar. 31, 1964

3,127,593
PERIODIC SIGNAL SYNCHRONIZER

Rolland R. Ritter, St. Paul, Minn., assignor to Sperry Rand Corporation, New York, N.Y., a corporation of Delaware Filed June 13, 1960, Ser. No. 35,749
6 Claims. (Cl. 340—174.1)

This invention relates to drum storage means and more particularly to apparatus and method for relocating randomly placed signals whereby all of the recorded signals on a storage drum are synchronized.

In present day communication and control systems it is often desirable to communicate from data handling machinery to human beings through aural means so that the person is free to use his eyes and extremities during incoming communications. The present invention is described in such a system, but obviously it encompasses a broader field. The means selected to convert machine signals to speech understandable by the recipient is a magnetic storage drum on which there is recorded a predetermined vocabulary, one word on each of the circumferentially recorded tracks. These tracks are sequentially selected by machine methods to construct intelligible speech. The signals recorded on the drum must be located so that the word spacing is proper and that readout will not begin during the middle of a word. To accomplish this spacing, all words are recorded in the same relative position on the drum with respect to the reading head associated with each word, and are therefore in synchronism.

One object of this invention is to provide a method and means operable to record signals economically and rapidly on a storage medium such that the recorded signals are accurately synchronized.

A further object is to provide a method and means for relocating a signal which has been randomly placed on a storage drum, or the like, by circumferentially adjusting the associated reading transducer until the readback signal is synchronized in an arbitrarily determined manner with a second prerecorded signal, and then transferring the first signal to a third track so that the readback signal from the third track is always in synchronism with the second readback signal.

Another object is to cause the signal transfer as in the last-mentioned object to be accomplished in only one revolution of the storage drum.

Still other objects of this invention will become apparent to those of ordinary skill in the art by reference to the following detailed description of the exemplary embodiments of the apparatus and the appended claims. The various features of the exemplary embodiments according to the invention may be best understood with reference to the accompanying drawings, wherein:

Figures 1, 2, 3:
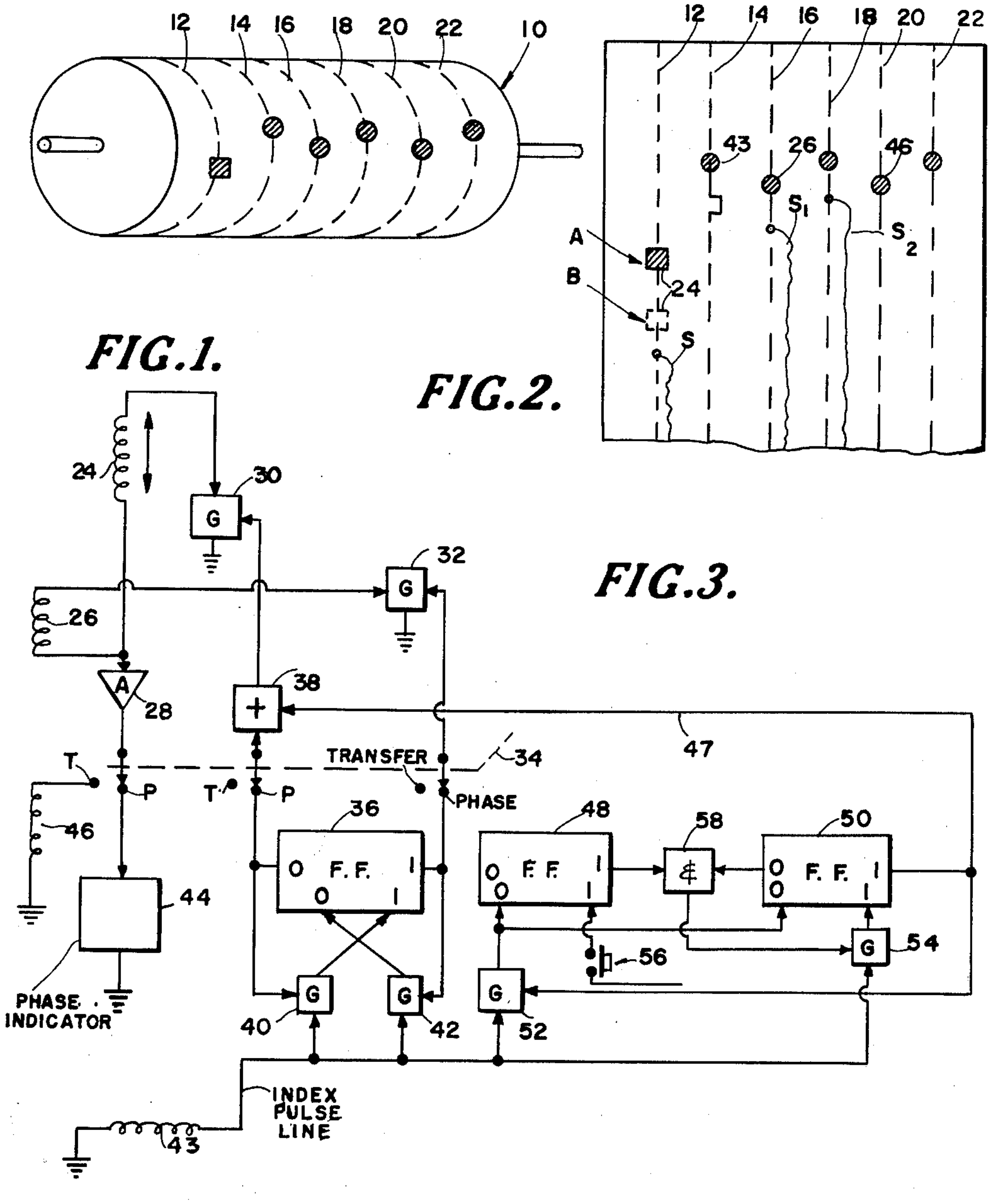
FIGURE 1 is a symbolic representation of a storage drum.
FIGURE 2 shows a developed view of a portion of the surface of the drum of FIGURE 1.
FIGURE 3 is a schematic view in block diagram form of the synchronization and transfer apparatus.

Referring to FIGURE 1, a cyclic storage drum 10 has a plurality of memory tracks represented by the dashed lines 12, 14, 16, 18, 20 and 22. The shaded circles associated with tracks 14, 16, 18, 20 and 22 represent fixed position read-record transducers or heads, while the shaded square associated with track 12 represents a similar read-record head circumferentially adjustable around the entire periphery of the drum. Memory track 12 is a master track on which there is located a prerecorded randomly placed signal. Track 14 is an index track having one pulse recorded thereon to indicate each revolution of the drum. At least one of the tracks 16, 18, 20 and 22 may contain a second prerecorded signal usable, if desired, as a phase reference signal in a manner to be described later. As the master track head is circumferentially adjusted, the time relationship of the readback signal from master track 12 changes with respect to the readback signal from any one of the fixed location heads. The number of memory tracks shown in FIGURE 1 is merely exemplary as there could be a lesser or greater number of tracks depending on the size of the drum. Track 12 may either be on the same drum as the tracks 14, 16, etc., or may be on a separate drum with the shafts of the drums locked rigidly together to insure the same rotational speed for all tracks. After all the signals have been synchronized and recorded on their ultimate tracks, the drums may be detached.

In the developed portion of the drum surface shown in FIGURE 2, a signal S is shown recorded on track 12 in a random manner so as to be out of phase with respect to signals $S_1$ and $S_2$ appearing on tracks 16 and 18 respectively, as indicated by the location, in position A, of the adjustable master track head with respect to the beginning of the signal S. Signals $S_1$ and $S_2$ may be considered as having been previously recorded by the apparatus and method being described such that the readback signal of each starts simultaneously. By adjusting the master track head from position A to position B for example, the readback of the signal S begins substantially in time coincidence with the readback of either of the signals $S_1$ or $S_2$. By transferring the signal S, as readback from position B, to either of the recording heads associated with memory tracks 20 or 22, the signal recorded thereon will produce a readback signal synchronized with the readback of any other signals stored on the drum. The time synchronism of the signal S on track 12 may be determined by comparing its readback phase to that of a signal prerecorded on one of the tracks 16 to 22, or in the case that no prerecorded signal exists in any track, by comparing it to the period of one revolution existing between two successive occurrences of the signal pulse read from the index track.

The apparatus shown in FIGURE 3, in block diagram form, is an embodiment of that which may be employed to accomplish the synchronization and transference of a random signal on the master track 12 to a selected memory track. There are two separate steps involved in getting properly synchronized words onto the drum. The first step is identified by "phase," the second by "transfer." These steps are now described in the sequence named.

Assume that there is a word synchronously stored on phase reference track 16, a word randomly stored on master track 12, an index pulse signal stored on index track 14, and that the drum is being driven at the proper speed. The master track head 24 reads the word stored on the master track 12 and the phase reference head 26 reads the word stored on the phase reference track 16. It should be noted that the phase reference signal may be obtained from any prerecorded track of the drum and that the embodiment herein described, that is, a signal on track 16 readback by head 26, is therefore merely exemplary. Both of the heads 24 and 26 are connected to the input of an amplifier 28. Each of the heads 24 and 26 is provided with an enabling gate 30 and 32, respectively. These gates are each enabled, in a manner to be described, to complete a circuit to ground such that the amplifier 28 alternately receives as an input first from the signal stored on master track 12 and then from the signal stored on phase reference track 16. With ganged switch 34 in the phase position P, as shown in FIGURE 3, the 1 state output of a bistable or flip-flop circuit 36 is applied as an enabling input to gate 32 while the 0 state output of flip-flop 36 is applied through an OR circuit 38 as an enabling input to gate 30. OR circuit 38 receives a second input from the right-hand or transfer portion of the apparatus which will be described later. During the phase operation being described, the transfer portion of the apparatus is inactive and does not provide any input to OR circuit 38.

Flip-flop 36 and its associated input gates 40 and 42 operate in a conventional manner. The 1 state output of flip-flop 36 also serves to enable gate 42 while the 0 state output also serves to enable gate 40. Gates 40 and 42 receive as an input the signal readout from index track 14 via head 43 as the storage drum 10 rotates. If flip-flop 36 is in its 1 state, gate 42 is enabled allowing an index pulse into the 0 output of flip-flop 36 causing it to change back to its 0 state whereupon gate 40 is enabled. The next occurrence of an index pulse will be fed into the 1 state input by way of gate 40 causing the flip-flop to change back to the 1 state. Since the index pulse occurs once during each revolution of the storage medium, flip-flop 36 alternates its state each revolution which results in gates 30 and 32 being alternately enabled thereby causing the input of amplifier 28 to alternately be supplied from the master track and phase reference heads 24 and 26, respectively.

Switch 34 is arranged in its illustrated phase position to couple the output of amplifier 28 to an indicating means 44 which may take the form, for example, of a pair of earphones. Therefore, the operator can listen to the alternately appearing signals and physically adjust the position of the master track head 24 so that the two signals from the master track and phase reference tracks 12 and 16, respectively, are each heard clearly and separately. This completes the "phase" step.

The indicating means 44 may also take the form, for example, of a dual trace oscilloscope receiving at one input the output of head 24 and at the second input the output of head 26 and having a sweep rate approximately equalling one revolution. The operator would then adjust the position of head 24 to place the two traces into alignment. Any other suitable indicating means may also be employed.

For the "transfer" step, switch 34 is placed in the transfer position T which removes the two outputs of flip-flop 36 from the inputs to gates 30 and 32, respectively, and switches the output of the amplifier 28 from the indicating means 44 to a selected one of the heads associated with one of the remaining unrecorded memory tracks. The selected head is shown in FIGURE 3 as a head 46 which may be associated with memory track 20, for example. Gate 30 and therefore the master track head 24 can now only be enabled when OR circuit 38 receives an input from the previously mentioned transfer portion of the apparatus via line 47.

This transfer section includes a pair of bistable or flip-flop circuits 48, 50 each of which has a set-to-1 input and a set-to-0 input, and each of which produces an output when in either of their possible states. For the sake of clarity, these states will be referred to as the 1 and 0 states, respectively. The signal readback from index track 14 via head 43 is additionally coupled as an input to each of a pair of gates 52 and 54. The output of gate 52 is applied to the set-to-0 input of both of flip-flops 48, 50. The output of gate 54 is applied to the set-to-1 input of flip-flop 50 while the set-to-1 input of flip-flop 48 receives an input through an actuating means 56 from a source not shown. This actuating means may, for example, take the form of a momentary contact switch, as illustrated. The 1 state output of flip-flop 48 and the 0 state output of flip-flop 50 are applied as inputs to an AND circuit 58 whose output is coupled as a second input to gate 54. The 1 state output of flip-flop 50 is supplied as a second input to gate 52 and as the previously mentioned second input or OR circuit 38. The 0 state output of flip-flop 48 is not employed. Both of flip-flops 48, 50 are normally in their 0 state whereby gates 52 and 54 are disabled and the said second input to OR circuit 38 is not present.

With switch 34 in its transfer position after synchronism has been determined, switch 56 is depressed causing flip-flop 48 to be set to its 1 state. The resultant 1 state output of flip-flop 48 and the 0 state output of flip-flop 50 are "ANDed" at 58 to produce an output which enables gate 54. The next subsequent index pulse after operation of switch 56 is therefore passed to the set-to-1 input of flip-flop 50 changing it to its 1 state. This 1 state output has two effects. First, gate 30 is enabled via line 47 and OR circuit 38 so that the signal readback from master track 12 via head 24 is amplified at 28 and fed to the selected head 46 to be recorded on track 20. Simultaneously, gate 54 is disabled since the 0 state output of flip-flop 50 is no longer present to cause an output from AND circuit 58, while gate 52 is enabled by 1 state output from flip-flop 50. The next successive pulse is therefore passed to the set-to-0 inputs of both flip-flops 48, 50 setting them to their 0 state. This in turn causes gate 30 to be disabled so that recording on track 20 occurs only once and only during the period of one drum revolution.

The operation may be repeated using other randomly placed replacement signals on track 12 with amplifier 28 being switchable to other writing heads until all of the desired words have been recorded onto the drum.

When a prerecorded signal does not appear on any one of the phase reference tracks 16, 18, 20 or 22, the "phase" step will differ from that described above. In this situation amplifier 28 only receives a signal on alternate revolutions of the drum from master track head 24. The randomly located signal on track 12 being readout by head 24 would, in this case, be synchronized to the period of one revolution between two successive occurrences of the index pulse on track 14, by adjusting the position of head 24 until the operator is informed by the indicating means 44 that the signal on track 12 is being readout distinctly and completely in the alternate periods of revolution during which head 24 is enabled. In effect, this is the same operation performed in the "phase" step when the random signal is referenced against a prerecorded signal appearing in any selected one of the reference tracks of the drum.

The signal, synchronized in this second manner, would then be recorded on any selected one of the reference tracks, for example on track 16, during the "transfer" step by connecting the head 26 into the circuit of FIGURE 3 to receive the synchronized output signal of amplifier 28 rather than having it applied to head 46 as presently illustrated. The circuit operation of the "transfer" step would, of course, be the same as previously described.

It can be seen, therefore, that all of the recorded signals appearing on the drum, are located on their respective tracks with respect to the associated fixed read-record heads such that the readback signal from one track will begin at substantially the same time as the readback signal from any other track on the drum and so that readback from any track will not begin in the middle of a word.

Thus it is apparent that this invention successfully achieves the various objects and advantages herein set forth.

Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. Apparatus for transferring a randomly placed signal recorded on one memory track of a cyclic storage medium to a second memory track wherein the transferred signal is synchronized with other recorded signals on other tracks of said storage medium, comprising said cyclic storage medium having a plurality of memory tracks, a master one of the said tracks having a randomly located signal recorded thereon, a second one of the said memory tracks having an index pulse recorded thereon for indicating each revolution of the said cyclic medium, a plurality of read-record heads one for each of the said memory tracks, the head associated with the said master track being circumferentially adjustable around said master track, first circuit means for producing a first output during the alternate periods between successive occurrences of the said index pulse, means coupling the output of the index track head as an input to the said first circuit means, first enabling means having an output for energizing the master track head, means coupling the said first output of the first circuit means as an input to the said first enabling means, means coupling the said output of the first enabling means to the said master track head, second circuit means for producing an output during the period between two successive occurrences of the said index pulse, said second circuit means being normally disabled and including activating means whereby the said output of the second circuit means is only produced once beginning with the next successive occurrence of the index pulse after said activating means is operated, means also coupling the said output of the index track head as an input to the said second circuit means, means coupling the said output of the second circuit means as an additional input the said first enabling means, sensing means for indicating time synchronism of the master track signal with respect to the alternate periods between two successive occurrences of the said index pulse, means for coupling the output of the master track head as an input to the said sensing means, switch means having two positions and arranged to complete the coupling of the said first output from the first circuit means and the said output from the master track head to the said first enabling means and to the said sensing means, respectively when in one of the said positions, said switch means arranged to break these said couplings and only couple the output of the said master track head as an input to the selected one of the other memory track heads when in the other of said positions, whereby the randomly located master track signal can be read in time synchronism with respect to the index pulse by adjusting the position of the master track head relative to the position of the index track head and then transferred in only one revolution of the medium to a selected memory track so as to be in time synchronism with respect to the index pulse and other later recorded signals appearing on other memory tracks.

2. Apparatus as in claim 1 wherein at least a third one of said memory tracks has a signal prerecorded thereon, said first circuit means also producing a second output during the intervening periods between said alternate periods, second enabling means having an output for energizing said prerecorded track head, means coupling the said second output of the first circuit means as an input to said second enabling means, means for coupling the said second enabling means output to the said prerecorded track, further means for coupling the alternately appearing output of the second prerecorded track head as an additional input to said sensing means, said switch means also being arranged to complete the coupling of the said second output from the first circuit to the said second enabling means when in the said one position and to break said coupling when in the said other position, whereby the randomly located master track signal can be read in time synchronism with respect to the prerecorded signal by adjusting the position of the memory track head relative to the position of the prerecorded track head and then transferred to a selected memory track so as to be in time synchronism with respect to other recorded signals on other memory tracks.

3. Apparatus as in claim 2 wherein the said first circuit means comprises a first bistable circuit for alternately producing said first and second outputs during the successive periods between occurrences of the said index pulse, said first output appearing when said first bistable circuit is in one of the possible two states and said second output appearing during the other of said possible states.

4. Apparatus as in claim 3 wherein the said second circuit means comprises two additional bistable circuits each having two outputs one for each of the possible states of said bistable circuits with each of said additional bistable circuits normally being in one of the said possible states, three additional enabling means each having an output, and said activating means, each of said additional bistable circuits having two inputs one of which sets the respective one of said bistable circuits to the said one state, the other of which sets the respective one of said bistable circuits to the other of the said states, means for coupling the output of the index track head as an input to the first and second ones of the said additional enabling means, means coupling the output of the first one of the said additional enabling means to the said one of the inputs of both of the said additional bistable circuits, means for coupling the output of the second one of the said additional enabling means to the said other input of one of the said additional bistable circuits, means coupling said activating means to the said other input of the other of the said additional bistable circuits, means coupling the said other state output of the said other bistable circuit as an input to the third one of said additional enabling means, means coupling the said one state output of the said one bistable circuit as a second input to the said third one of the additional enabling means, means coupling the output of the said third enabling means as a second input to the said second one of the additional enabling means, means coupling the said other state output of the said one bistable circuit as a second input to the said first one of the additional enabling means and as the said additional input to the said first enabling means.

5. Apparatus as in claim 4 including an amplifier having an output, means for coupling the alternately appearing outputs of the master track and index track heads as inputs to said amplifier, said switch means arranged to connect the said amplifier output as the input to the said sensing means when in the said one position and to connect the said amplifier output as an input to a selected one of the other memory track heads when in the said other position.

6. Apparatus as in claim 5 wherein the said one enabling means comprises a gate circuit and an OR circuit each having an output, means coupling both the said first output of the first bistable circuit and the said other state output of the said one bistable circuit as inputs to the said OR circuit, said gate circuit being coupled between the output of the said OR circuit and the said master track head, wherein the said third one of the additional enabling means is an AND circuit, and wherein all other of the said enabling means are gate circuits.

References Cited in the file of this patent

UNITED STATES PATENTS

| | | |
|---|---|---|
| 2,770,797 | Hamilton et al. | Nov. 13, 1956 |
| 2,926,249 | Lindsey | Feb. 23, 1958 |
| 2,838,743 | Fredriksson | June 10, 1958 |
| 2,888,663 | Blake et al. | May 26, 1959 |